US012651062B2

(12) United States Patent
Elgaafary et al.

(10) Patent No.: US 12,651,062 B2
(45) Date of Patent: Jun. 9, 2026

(54) SYSTEM AND METHOD FOR ARCHIVE AM SCANNING

(71) Applicant: UAB 360 IT, Vilnius (LT)

(72) Inventors: Mohamed Adly Amer Elgaafary, Vilnius (LT); Aleksandr Ševčenko, Vilnius (LT)

(73) Assignee: UAB 360 IT, Vilnius (LT)

( * ) Notice: Subject to any disclaimer, the term of this patent is extended or adjusted under 35 U.S.C. 154(b) by 66 days.

(21) Appl. No.: 18/377,999

(22) Filed: Oct. 9, 2023

(65) Prior Publication Data

US 2024/0037232 A1     Feb. 1, 2024

Related U.S. Application Data

(63) Continuation of application No. 17/673,168, filed on Feb. 16, 2022, now Pat. No. 11,816,215.

(51) Int. Cl.
*G06F 21/56*          (2013.01)

(52) U.S. Cl.
CPC ...... *G06F 21/565* (2013.01); *G06F 2221/034* (2013.01)

(58) Field of Classification Search
CPC .......................... G06F 21/565; G06F 2221/034
USPC ........................................................ 726/23
See application file for complete search history.

(56) References Cited

U.S. PATENT DOCUMENTS

| | | | | |
|---|---|---|---|---|
| 6,851,058 | B1 * | 2/2005 | Gartside | ............... G06F 21/56 726/24 |
| 8,863,284 | B1 | 10/2014 | Polyakov | |
| 10,621,346 | B1 | 4/2020 | Singh | |
| 2005/0138081 | A1 * | 6/2005 | Alshab | ................... G06Q 10/06 |
| 2008/0141373 | A1 | 6/2008 | Fossen | |
| 2009/0254575 | A1 | 10/2009 | Kravets | |
| 2011/0083181 | A1 | 4/2011 | Nazarov | |
| 2014/0143889 | A1 * | 5/2014 | Ginter | ..................... G06F 21/87 726/27 |
| 2015/0142742 | A1 | 5/2015 | Hong | |
| 2015/0234848 | A1 | 8/2015 | Weinstein | |
| 2017/0359368 | A1 | 12/2017 | Hodgman | |
| 2018/0091306 | A1 | 3/2018 | Antonopoulos | |
| 2018/0101542 | A1 | 4/2018 | Zhao | |
| 2018/0203998 | A1 | 7/2018 | Maisel | |
| 2019/0065744 | A1 * | 2/2019 | Gaustad | ................ G06F 21/562 |
| 2019/0138446 | A1 | 5/2019 | Iyer | |
| 2020/0327227 | A1 * | 10/2020 | Chebyshev | ........... G06F 21/565 |

(Continued)

OTHER PUBLICATIONS

Barrett, "NCBI GEO: archive for functional genomics data sets-update", Nov. 27, 2012, Nucleic acids research, pp. 991-994 (Year: 2012).*

(Continued)

*Primary Examiner* — Taghi T Arani
*Assistant Examiner* — Gregory A Lane
(74) *Attorney, Agent, or Firm* — Moser Taboada

(57) ABSTRACT

Systems and methods for archive scanning are provided herein. In some embodiments, a method includes: selecting an archive; reading a metadata representing a plurality of files within the archive; reading a plurality of hash strings from the archive; comparing the plurality of hash strings with a database of hash strings; and determining, based on the comparing, if the plurality of files within the archive represent a security threat based on the plurality of hash strings.

20 Claims, 4 Drawing Sheets

100

(56) References Cited

U.S. PATENT DOCUMENTS

| | | | |
|---|---|---|---|
| 2021/0056204 A1* | 2/2021 | Singh | .................... G06F 21/565 |
| 2021/0357364 A1 | 11/2021 | Saliba | |

OTHER PUBLICATIONS

You, "Evaluation of Efficient Archival Storage Technique", 2004, MSST, pp. 1-5 (Year: 2004).*
Miao, "Towards unified data and lifecycle management for deep learning", 2017, IEEE, pp. 571-582 (Year: 2017).

* cited by examiner

200

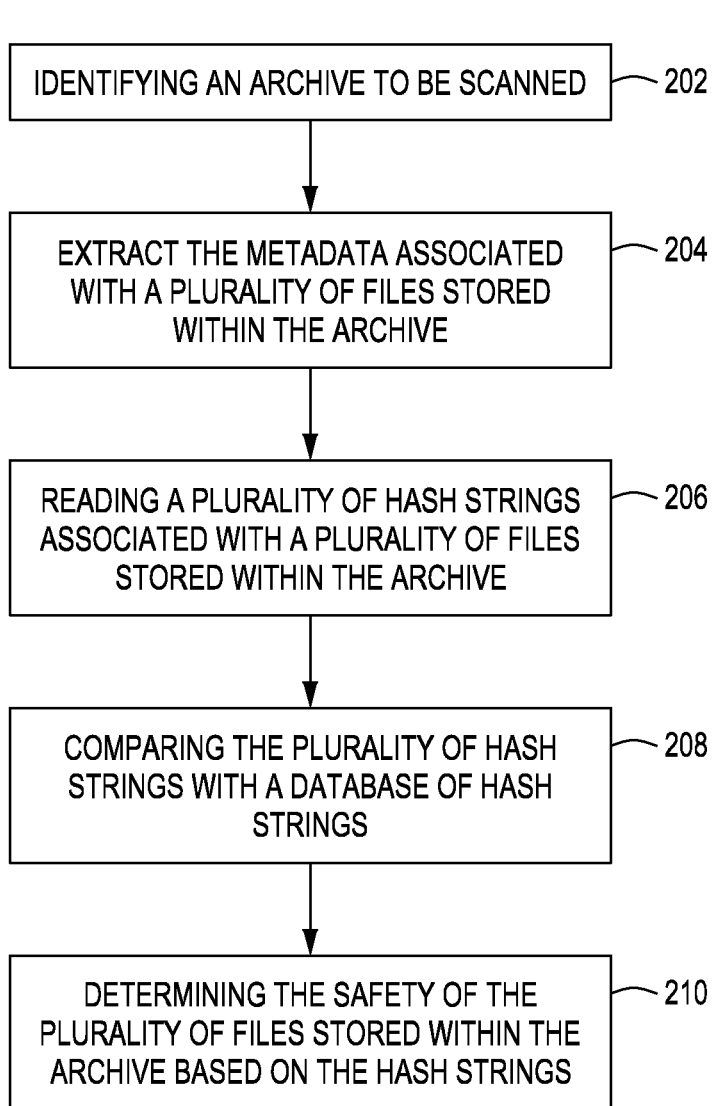

IDENTIFYING AN ARCHIVE TO BE SCANNED — 202

EXTRACT THE METADATA ASSOCIATED WITH A PLURALITY OF FILES STORED WITHIN THE ARCHIVE — 204

READING A PLURALITY OF HASH STRINGS ASSOCIATED WITH A PLURALITY OF FILES STORED WITHIN THE ARCHIVE — 206

COMPARING THE PLURALITY OF HASH STRINGS WITH A DATABASE OF HASH STRINGS — 208

DETERMINING THE SAFETY OF THE PLURALITY OF FILES STORED WITHIN THE ARCHIVE BASED ON THE HASH STRINGS — 210

FIG. 2

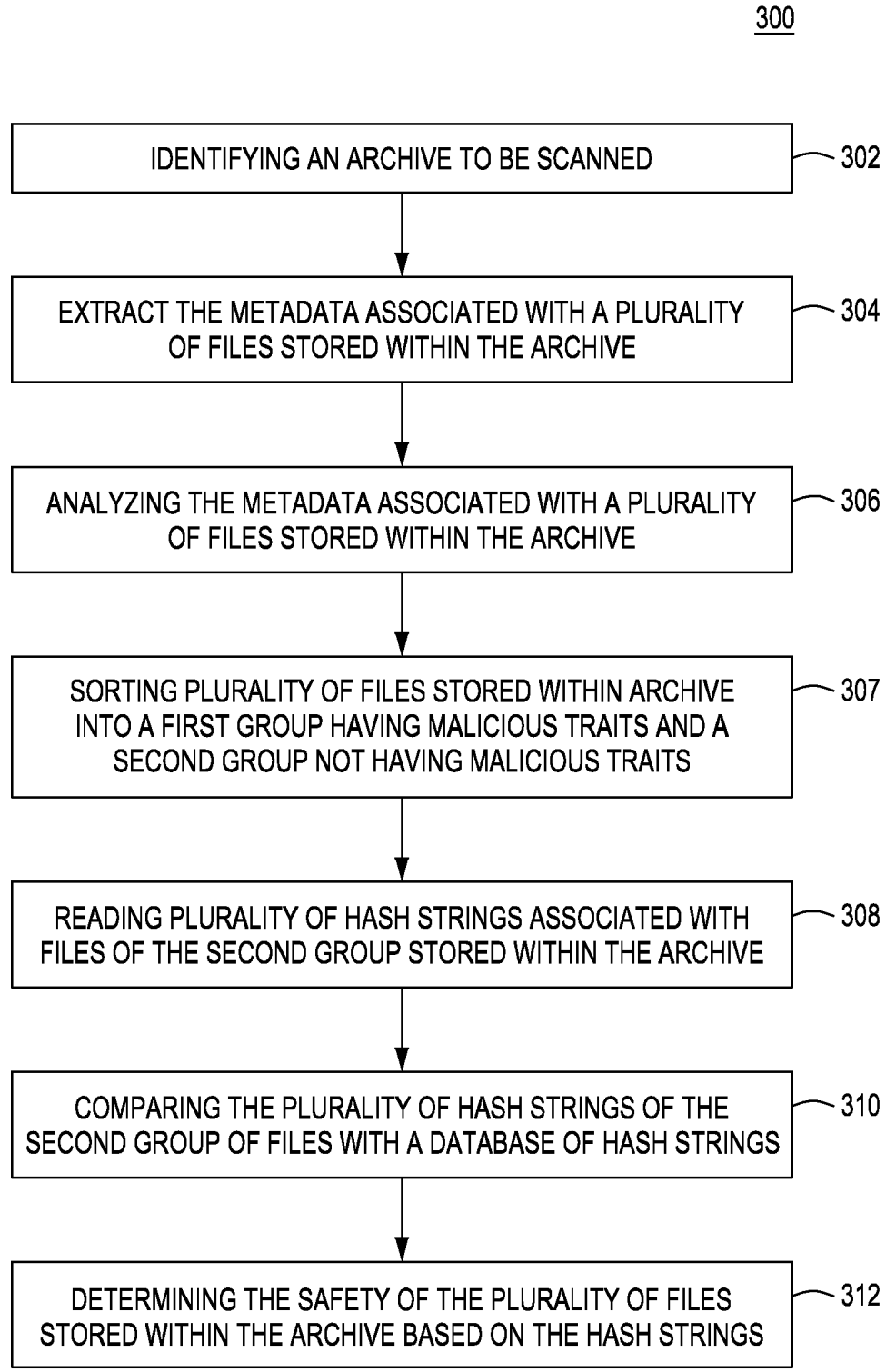

_300_

IDENTIFYING AN ARCHIVE TO BE SCANNED — 302

EXTRACT THE METADATA ASSOCIATED WITH A PLURALITY OF FILES STORED WITHIN THE ARCHIVE — 304

ANALYZING THE METADATA ASSOCIATED WITH A PLURALITY OF FILES STORED WITHIN THE ARCHIVE — 306

SORTING PLURALITY OF FILES STORED WITHIN ARCHIVE INTO A FIRST GROUP HAVING MALICIOUS TRAITS AND A SECOND GROUP NOT HAVING MALICIOUS TRAITS — 307

READING PLURALITY OF HASH STRINGS ASSOCIATED WITH FILES OF THE SECOND GROUP STORED WITHIN THE ARCHIVE — 308

COMPARING THE PLURALITY OF HASH STRINGS OF THE SECOND GROUP OF FILES WITH A DATABASE OF HASH STRINGS — 310

DETERMINING THE SAFETY OF THE PLURALITY OF FILES STORED WITHIN THE ARCHIVE BASED ON THE HASH STRINGS — 312

FIG. 3

SYSTEM AND METHOD FOR ARCHIVE AM SCANNING

CROSS-REFERENCE TO RELATED APPLICATIONS

This application is a continuation of U.S. patent application Ser. No. 17/673,168, filed Feb. 16, 2022, the entire contents of which are incorporated by reference herein.

FIELD

The present disclosure relates generally to computer security, and more particularly to identifying security issues in archived files.

BACKGROUND

One strategy for protecting against malware includes using malware detectors, such as virus and spyware scanners. The scanners decide if a scanned data is a threat, based on the data they collect on it. The data may be collected with or without executing the scanned data file. Static analysis is a process of analyzing a malware binary without actually running the code. However, the process is hindered by compressed files or archives where the nature and content of the files are not immediately clear. The traditional approach required extracting the archives before scanning them, which can be time consuming.

SUMMARY

Systems and methods for anti-malware scanning archives are provided herein. In some embodiments, an archive scanning method includes selecting an archive for anti-malware scanning; extracting the metadata for a plurality of files within the archive; reading a plurality of hash strings for the files within the archive; comparing the plurality of hash strings with a database of hash strings of known malware; and determining, based on the comparing, if the files within the archive represent a security threat without extracting the entire archive.

In other embodiments, an archive scanning method includes selecting an archive; extracting a metadata representing a plurality of files within the archive; analyzing the metadata representing a plurality of files within the archive; based on the analyzing, sorting the plurality of files into a first group having malicious traits and a second group not having malicious traits; reading a plurality of hash strings of the files of the second group from the archive; comparing the plurality of hash strings with a database of hash strings; and determining if the plurality of files within the archive second group represent a security threat based on the metadata and the plurality of hash strings.

In other embodiments, the system includes a user device, a database, and a processor programmed to select an archive for anti-malware scanning, extracting the metadata for a plurality of files within the archive, analyzing the metadata representing the plurality of files within the archive, reading a plurality of hash strings for files within the archive, comparing the plurality of hash strings with a database of hash strings of known malware, and determining if the files within the archive represent a security threat based on the hash strings and other metadata without fully extracting the archive.

In other embodiments, a non-transitory computer readable medium having instructions stored thereon, which, when executed by the at least one processor, causes the at least one processor to perform a method for controlling access to process data comprising: selecting an archive for anti-malware scanning, extracting the metadata for a plurality of files within the archive, analyzing the metadata representing the plurality of files within the archive, reading a plurality of hash strings for files within the archive, comparing the plurality of hash strings with a database of hash strings of known malware, and determining if the files within the archive represent a security threat based on the hash strings and other metadata without fully extracting the archive.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 2 depicts a flow diagram of a method for archive anti-malware scanning, in accordance with an embodiment of the present disclosure.

FIG. 3 depicts a flow diagram of a method for archive anti-malware scanning, in accordance with an embodiment of the present disclosure.

Figure 1:
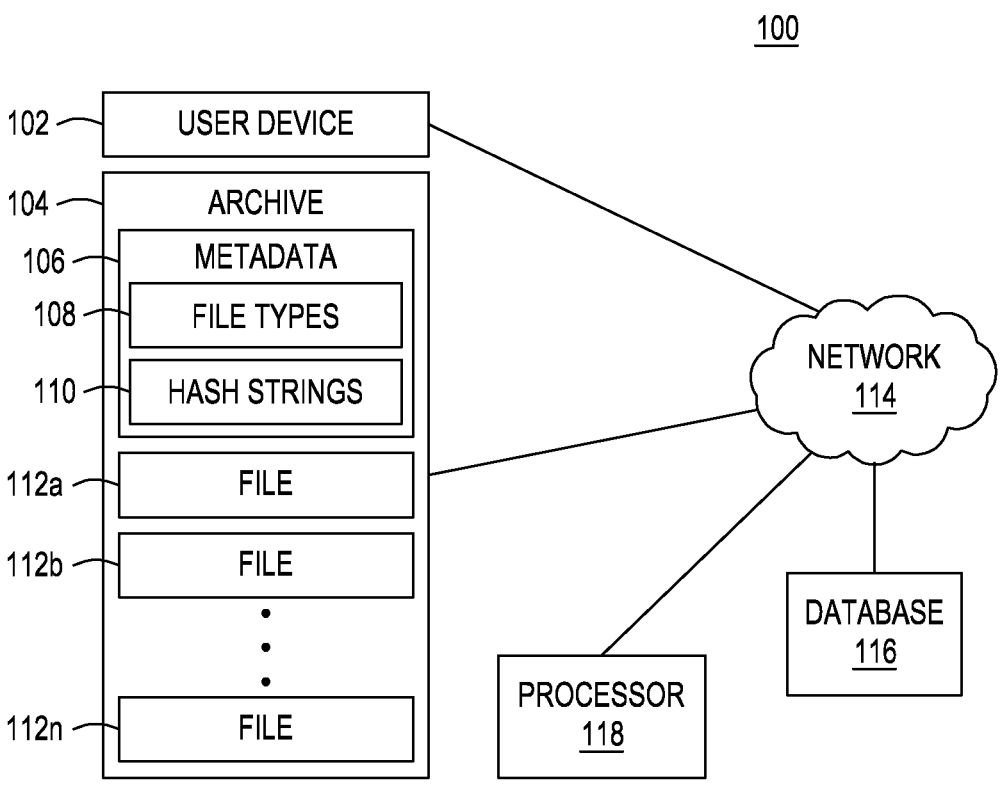
FIG. 1 depicts a high-level block diagram of a network architecture of a system for efficient security scanning of recently downloaded files from the Internet into a computer system in accordance with an embodiment of the present disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for archive anti-malware scanning. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the present disclosure use a solution that allows for the anti-malware scanning of archived files without requiring extracting archives before scanning. Such a system is more efficient when compared to traditional static analysis systems that require extracting the archives before scanning them.

For example, with reference to FIG. 1, in some embodiments, system 100 includes an archive 104 to be scanned for malware. This archive contains a plurality of files 112*a*-112*n*. The archive 104 additionally contains metadata 106 about the files 112*a*-112*n*, including but not limited to the file types 108 and hash strings 110. The archive may be any number of archive formats, including but not limited to, zip, rar, 7z, and tar files. The archive 104 is accessible by the user device 102. In some embodiments, the archive 104 may be stored in a memory of the user device 102. In some embodiments, the archive 104 is hashed and compared against the database 116 of hashes. If the archive 104 hash strings match a hash in the database 116, the archive 104 represents a security threat.

The system 100, scans the archive 104 for malware without fully extracting or decompressing the files 112*a*-112*n* within the archive 104. By analyzing the metadata 106 within the archive 104, the hash strings 110 or file types 108 of the files 112*a*-112*n* within the archive 104 can be used to determine the safety of the files 112*a*-112*n* within the archive 104. Other forms of metadata 106, including but not limited to file size, file name, and date of create may be used to determine the safety of the files 112*a*-112*n* within the archive 104.

The system, 100 includes a database 116 of hashes of known malicious files. The hash strings 110 may be compared against the database 116 of hashes. If the hash strings 110 of any of the files 112*a*-112*n* match a hash in the database 116, the matching files 112*a*-112*n* within the archive 104 represents a security threat.

The system 100 includes a network 114 over which the system 100 may be operated. The network 114 is wired and/or wireless, for example. The network 114 is local and/or global with respect to system 100, for instance. The user device 102 communicates with the database 116 through the network 114 in order to scan an archive 104. In some embodiments, the database 116 is local and may be updated via the network 114 from the control infrastructure.

FIGS. 2 and 3 illustrate example flow diagrams representing one or more of the processes in accordance with embodiments of the present disclosure. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 is a flow diagram of an example method 200 for archive anti-malware scanning, in accordance with an embodiment of the present disclosure. The method 200 may begin at 202 by identifying an archive to be scanned for malware. At step 204, the metadata associated with a plurality of files stored within the archive 104 is extracted without decompressing the entire archive 104. In some embodiments, the metadata is read without decompressing it. At step 206, from the metadata, a plurality of hash strings 110 for the plurality of files 112*a*-112*n* stored within the archive 104 is read. At step 208, the hash strings 110 are compared with a database 116 of hash strings representing known forms of malware. Known forms of malware (e.g., malicious files) with hash strings stored in the database 116 may include, but are not limited to, adware, viruses, worms, trojans, and ransomware. At step 210 the safety of the files 112*a*-112*n* within the archive 104 is be determined without decompressing the entire archive 104. Those files within the archive 104 that have hash strings matching any hash strings in the database 116 are identified as a security threat.

In some embodiments, additional steps are taken, including calculating the file size of the files 112*a*-112*n* stored within the archive 104 before scanning the archive 104 and checking if the archive 104 contains one or more additional archives in order to determine if the archive is a zip bomb.

FIG. 3 depicts a flow diagram of another method 300 for archive anti-malware scanning, in accordance with an embodiment of the present disclosure. The method begins at step 302 by identifying an archive 104 to be scanned for malware. At step 304, the metadata 106 associated with a plurality of files 112*a*-112*n* stored within the archive 104 is extracted without decompressing the entire archive 104. In some embodiments, the metadata is read without decompressing it. At step 306, the metadata 106 is analyzed by looking for traits that may indicate the existence of malware (e.g., malicious files). Traits found in the metadata 106 that may be indicative of malware are certain file types, such as executables, and large file sizes, which may indicate a zip bomb. At step 307, the plurality of files 112*a*-112*n* stored in the archive 104 are sorted into a first group identified as having malicious traits and a second group identified as not having malicious traits.

At step 308, from the metadata, a plurality of hash strings 110 for the files 112*a*-112*n* in the second group are read. At step 310, the hash strings 110 of files of the second group are then compared with a database 116 of hash strings representing known forms of malware. Known forms of malware with hash strings stored in the database 116 may include, but are not limited to, adware, viruses, worms, trojans, and ransomware. At step 312, the safety of the files of the second group can be determined without decompressing the entire archive 104 based on the comparison of the hash strings of the files in the second group against the hash strings in the database 116. Those files within the second group that have hash strings 110 matching any hash strings on the database 116 are identified as a security threat.

Thus, the analysis at step 306 can sort the files 112*a*-112*n* in the archive 104 into files needing further checking and those that do not, which can reduce processing time in comparison to the method 200 in which the hashes of all the files 112*a*-112*n* in the archive 104 are checked against hash strings in the database 116.

In some embodiments, when the archive to be scanned is encrypted, an additional step of breaking the encryption is performed.

Figure 4:
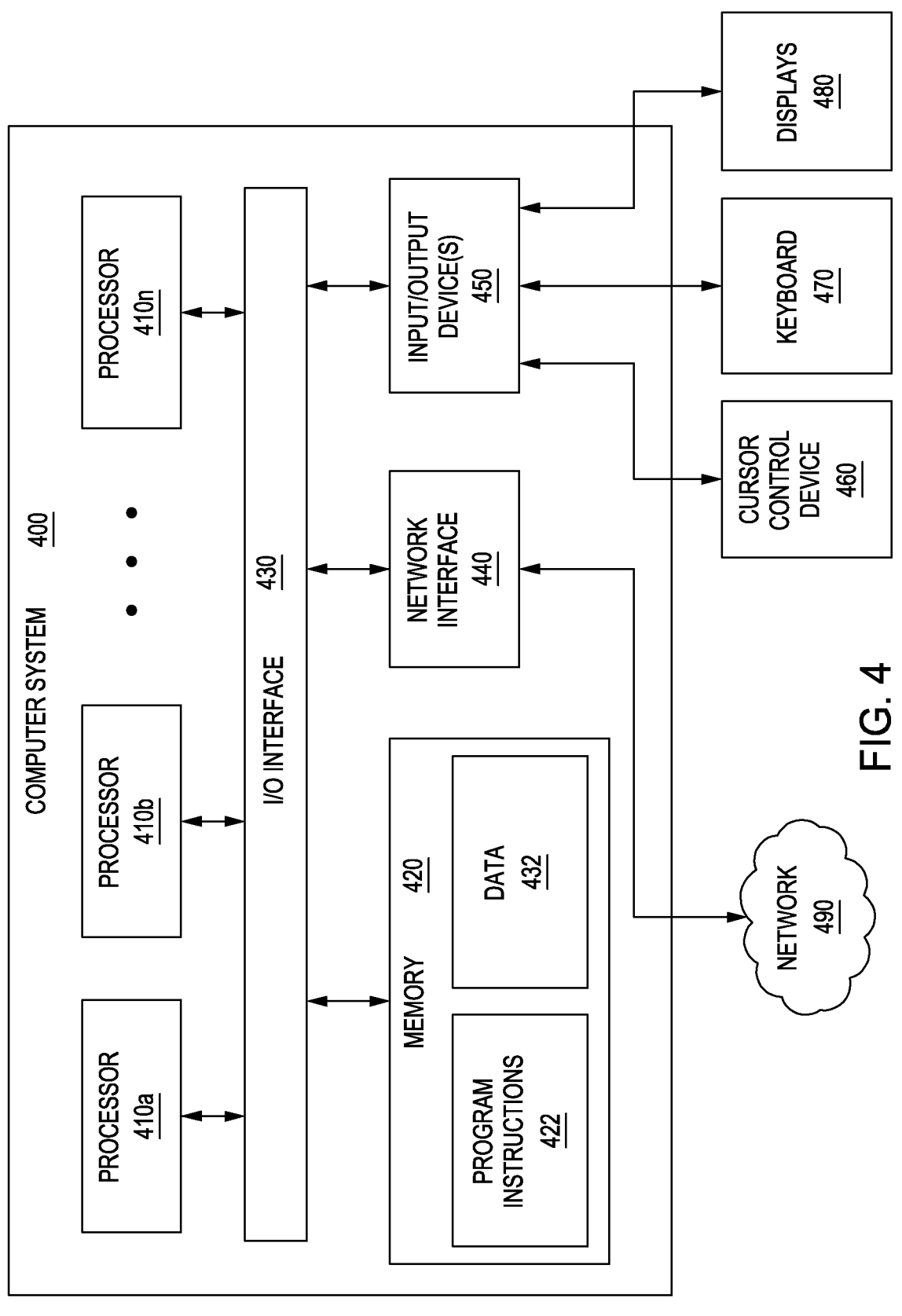
FIG. 4 depicts a high-level block diagram of a computing device suitable for use with embodiments for archive anti-malware scanning in accordance with the present disclosure.

FIG. 4 depicts a computer system 400 that can be utilized in various embodiments of the present disclosure to implement the computer and/or the display, according to one or more embodiments.

Various embodiments of method and system to identify security issues in downloaded files such as from the Internet, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality, or method of the above-described embodiments. In the illustrated embodiments, computer system 400 may be configured to implement the methods 200 and 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent, or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing, or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the methods illustrated by the flowchart of FIGS. 2-3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted, or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

Example Clauses

A. An archive scanning method comprising:
selecting an archive;
reading a metadata representing a plurality of files within the archive;
reading a plurality of hash strings from the archive;
comparing the plurality of hash strings with a database of hash strings; and
determining, based on the comparing, if the plurality of files within the archive represent a security threat.

B. The method of clause A, further comprising calculating a file size associated with the plurality of files within the archive.

C. The method of clause A or B, further comprising determining if the archive contains one or more additional archives.

D. The method of clauses A-C, wherein the archive is a ZIP or RAR file.

E. The method of clauses A-D, further comprising communicating with a database of hash strings over a network.

F. The method of clauses A-E, further comprising breaking an encryption of the archive.

G. An archive scanning method comprising;
selecting an archive;
reading a metadata representing a plurality of files within the archive;
analyzing the metadata representing a plurality of files within the archive;

based on the analyzing, sorting the plurality of files into a first group having malicious traits and a second group not having malicious traits;

reading a plurality of hash strings of the files of the second group from the archive;

comparing the plurality of hash strings with a database of hash strings; and determining if the plurality of files within the second group represent a security threat based on the metadata and the plurality of hash strings.

H. The method of clause G, further comprising calculating, based on the metadata, a file size associated with the plurality of files within the archive.

I. The method of clause G or H, further comprising determining if the archive contains one or more additional archives.

J. The method of clauses G-I, wherein the metadata includes file type.

K. The method of clauses G-J, wherein the metadata includes file size.

L. The method of clauses G-K, wherein the archive is a ZIP or RAR file.

M. The method of clauses G-L, further comprising communicating with a database of hash strings over a network.

N. A security system comprising:
   a user device;
   a processor programmed to:
      select an archived file;
      reading a metadata representing a plurality of files within the archive;
      analyze the metadata representing a plurality of files within the archive;
      read a plurality of hash strings from the archive;
      compare the plurality of hash strings with a database of hash strings; and
      determine if the plurality of files within the archive represent a security threat based on the metadata and the plurality of hash strings.

O. The system of clauses N, wherein the metadata includes file type.

P. The system of clauses N or O, wherein the metadata includes file size.

Q. The system of clauses N-P, wherein the archive is a ZIP or RAR file.

R. The system of clauses N-Q, further comprising the processor communicating with a database of hash strings over a network.

S. The system of clauses N-R, further comprising the processor calculating a file size associated with the plurality of files within the archive.

T. The system of clauses N-S, further comprising the processor determining if the archive contains one or more additional archives.

What is claimed is:

1. An archive scanning method comprising:

selecting an unextracted archive file that includes a plurality of files and metadata of the plurality of files in the unextracted archive file;

extracting the metadata without extracting the plurality of files;

sorting the plurality of files, based on the extracted metadata, into a first group having malicious traits and a second group not having malicious traits, wherein the sorting includes comparing the metadata to predefined metadata criteria, wherein the compared metadata does not include hash strings;

comparing a plurality of hash strings of files of the second group and not the first group with a database of hash strings; and determining, based on the comparing, if the plurality of files within the archive represent a security threat.

2. The method of claim 1, further comprising calculating a file size associated with the plurality of files within the archive file.

3. The method of claim 1, further comprising determining if the archive file contains one or more additional unextracted archive files.

4. The method of claim 1, wherein the archive file is a ZIP or RAR file.

5. The method of claim 1, wherein the metadata includes at least one of file size, file name, file type, or date of file creation.

6. The method of claim 1, further comprising breaking an encryption of the archive file.

7. A non-transient computer readable medium having stored thereon computer readable instructions, which when executed by a computer, perform an archive scanning method comprising;

selecting an unextracted archive file that includes a plurality of files and metadata of the plurality of files in the unextracted archive file;

extracting the metadata without extracting the plurality of files;

sorting the plurality of files, based on the extracted metadata, into a first group having malicious traits and a second group not having malicious traits, wherein the sorting includes comparing the metadata to predefined metadata criteria, wherein the compared metadata does not include hash strings;

comparing a plurality of hash strings of files of the second group and not the first group with a database of hash strings; and determining, based on the comparing, if the plurality of files within the archive represent a security threat.

8. The non-transient computer readable medium of claim 7, further comprising calculating, based on the metadata, a file size associated with the plurality of files within the archive file.

9. The non-transient computer readable medium of claim 7, further comprising determining if the archive file contains one or more additional archives.

10. The non-transient computer readable medium of claim 7, wherein the metadata includes at least one of file type, file name, or date of creation.

11. The non-transient computer readable medium of claim 7, wherein the metadata includes file size.

12. The non-transient computer readable medium of claim 7, wherein the archive file is a ZIP or RAR file.

13. The non-transient computer readable medium of claim 7, wherein the method further comprises breaking an encryption of the archive.

14. A security system comprising:
   a user device; and
   a processor programmed to:
      select an unextracted archive file that includes a plurality of files and metadata of the plurality of files in the unextracted archive file;
      extract the metadata without extracting the plurality of files;
      sort the plurality of files, based on the extracted metadata, into a first group having malicious traits and a second group not having malicious traits, wherein the sorting includes comparing the metadata to predefined metadata criteria, wherein the compared metadata does not include hash strings;

compare a plurality of hash strings of files of the second group and not the first group with a database of hash strings; and determine, based on the comparing, if the plurality of files within the archive represent a security threat.

15. The system of claim 14, wherein the metadata includes at least one of file type or file size.

16. The system of claim 14, wherein the metadata includes at least one of file name or date of file creation.

17. The system of claim 14, wherein the processor is configured to break an encryption of the archive file.

18. The system of claim 14, wherein the archive file is a ZIP or RAR file.

19. The system of claim 14, further comprising the processor calculating a file size associated with the plurality of files within the archive file.

20. The system of claim 14, further comprising the processor determining if the archive file contains one or more additional unextracted archive files.

\*    \*    \*    \*    \*